United States Patent
Braun

(10) Patent No.: US 6,414,789 B2
(45) Date of Patent: Jul. 2, 2002

(54) REAR PROJECTION SCREEN

(75) Inventor: Thomas Braun, Heusweiler (DE)

(73) Assignee: Bauglasindustrie GmbH (DE)

( * ) Notice: Subject to any disclaimer, the term of this patent is extended or adjusted under 35 U.S.C. 154(b) by 0 days.

(21) Appl. No.: 09/797,104

(22) Filed: Mar. 1, 2001

(30) Foreign Application Priority Data

Mar. 2, 2000 (DE) .......................... 200 03 848

(51) Int. Cl.$^7$ ............................................. G03B 21/56
(52) U.S. Cl. ....................................................... 359/460
(58) Field of Search ........................ 359/449, 451, 359/453, 460, 456

(56) References Cited

U.S. PATENT DOCUMENTS 3,180,215 A * 4/1965 Hourdiaux ................... 359/451
4,379,617 A * 4/1983 Funakoshi et al. .......... 359/453
4,597,633 A * 7/1986 Fussell ........................ 359/451
5,121,252 A * 6/1992 Okada ......................... 359/456
6,347,012 B1 * 2/2002 Monson et al. ............. 359/451

FOREIGN PATENT DOCUMENTS

DE    1 784 056    7/1971
DE    80 26773    3/1981

* cited by examiner

*Primary Examiner*—Christopher Mahoney
(74) *Attorney, Agent, or Firm*—Marshall & Melhorn, LLC

(57) ABSTRACT

Rear projection screen with a translucent image-forming surface arranged between a projector and the viewer. The image-forming surface is formed by bases, possessing light-diffusing properties, of a number of U-shaped construction elements arranged side-by-side. Preferably the U-shaped construction elements consist of glass and their bases are provided with a coating of a light-diffusing varnish imparting the impression of a sand-blasted surface.

19 Claims, 1 Drawing Sheet

REAR PROJECTION SCREEN

BACKGROUND OF THE INVENTION

The Invention concerns a rear projection screen with a translucent image-forming surface arranged between a projector and the viewer.

The image-forming surface serves to render visible a virtual image produced by still or motion picture projectors. In order to permit observation of the image from the side facing away from the projector, the rear projection screen must be light-transmitting and produce light diffusion.

Rear projection screens are known in the field of advertising and information in numerous ways. They can consist according to DE 80 26 773 U1 in their simplest form of a sand-blasted ground-glass screen. Their maximum possible dimensions are restricted by structural considerations. That is to say, large-area rear projection screens can in principle be set up where the image-forming surface consists of several ground-glass screens arranged above another and/or side-by-side. Such rear projection screens have not however become known hitherto. They could only be produced at considerable structural expense. The wind load acting on such a structure would necessitate such a robust supporting structure that the quality of the image projection would be significantly impaired. In addition, imparting a mat finish by sand-blasting reduces the strength of glass, which, in the case of large-area rear projection screens consisting of numerous sand-blasted ground-glass screens, would additionally lead to stability problems.

SUMMARY OF THE INVENTION

The purpose of the Invention is to provide a large-area rear projection screen which can be used outdoors, permits image projection of sufficiently high quality and can be produced with little expense and onto which one can project in front of a building, for example a large movie theater, images which are recognizable from a long distance.

According to the Invention, provision is made for the image-forming surface to be formed by bases possessing light-diffusing properties of a number of U-shaped profile elements arranged side-by-side.

When setting the light-diffusing properties of the bases of the U-shaped profile elements within the scope of the Invention, it is possible to resort to the general knowledge of rear projection screens. Preferably, the light transmission TL of the bases (with vertical light incidence) will be at least approximately 50% with a proportion of diffused light of the light transmitted sufficiently high to permit rear projection. If viewing of the image produced is to be permitted from a wide angle, the light diffusion is to be set as uniformly as possible over the entire range from 0 to 180°. If, on the other hand, the image should be especially visible from a certain viewing position, it is to be ensured that the light diffusion effect in the direction concerned is higher than in other directions.

Of course, the bases need not possess the same light-diffusing properties over their entire width and height. On the contrary, is will suffice if the predominant portion of the bases are provided with light-diffusing properties.

Preferably, the U-shaped profile elements will consist of glass. U-shaped profile glass elements usually consist of alkali silicate glass whose U-shaped profile is imparted to it like cast glass in the machine rolling process. It is translucent, with an irregular or ornamental surface produced by the production process and possesses on the whole quality features typical of cast glass. The light transmission for commercial, U-shaped profile glass elements laid in a single layer without light-diffusing properties is up to 89%; for U-shaped profile glass elements laid in two layers, it is up to 81%. Of course, the light diffusion of the bases of the U-shaped profile glass elements according to the Invention must be significantly higher than in the case with commercial U-shaped profile glass elements with or without ornamentation.

By light-diffusing properties within the scope of the Invention is meant that only a small proportion, preferably less than 10%, of the transmitted light experiences no or only slight deflection. The structures suitable for rear projection (surface roughening, frosting, light-diffusing coatings, internal structures or the like) must possess dimensions in the micron range. These are typically in the range from 1 to 100 microns, preferably approximately 50 microns. Such textured surfaces produce a mat effect in incident light and are practically opaque with high intensity of the incident light.

Commercial U-shaped profile glass elements are manufactured in a thickness of 6 or 7 mm, with a length of up to 7000 mm, with a base width of 232 to 498 mm and with a flange height of 41 or 60 mm. U-shaped profile glass elements are especially weather-resistant and insensitive to corrosive air in industrial and coastal regions.

The use of U-shaped profile glass elements with increased light-diffusing action for construction of building walls is already known from DE 17 84 056 A1. There, for the purpose of thermal insulation, the U-shaped profile glass elements are combined with spun glass or capillary sheets or films with high reflectivity and light filtration. These measures are additionally intended to produce sufficient diffusion of the incident light from outside such that uniform interior illumination is achieved with daylight.

Surprisingly, the flanges of the U-shaped profile elements, which are usually aligned perpendicular to the bases and thus essentially parallel to the direction of projection, disturb only insignificantly on implementation of the Invention. Of course, in the case of U-shaped profile elements utilizable within the scope of the Invention, the thickness of the flanges must be significantly less than the width of the bases, as only in this way is sufficiently good image quality achievable. Preferably, U-shaped profile elements will be used where the flange thickness is a maximum of approximately 1/10 of the width of the base.

In practical application, the U-shaped profile elements will be normally installed such that their flanges are facing towards the projector. In this way, the surface of the rear projection screen facing the viewer located outside the building will be easy to clean and aesthetically pleasing.

With the Invention, it is possible to construct rear projection screens of practically any surface dimensions. By using a number of U-shaped profile elements which are light-diffusing in the area of their bases, which—as already described—consist preferably of glass, it is guaranteed that even large-area projection screens can still possess sufficient stability. According to the Invention, it is even possible, by virtue of the special mechanical properties of U-shaped profile elements, to impart the light-diffusing properties by sand-blasting at least one of the surfaces of the bases.

It lies within the scope of the Invention to use U-shaped profile elements whose bases consist of a light-diffusing material. The light-diffusing effect can be achieved, for example, by embedding very small particles with a refractive index differing from that of the matrix, gas bubbles for example, in the material of the base. Preferably instead however, at least one of the surfaces of the bases will be provided with a coating imparting the visual impression of a sand-blasted surface, or subjected to a frosting treatment. In this way, it is possible, to reduce the cost of manufacture of the rear projection screens, to use commercial U-shaped profile elements which are only modified superficially for the special application. Here, it is of special advantage for the inner surfaces of the bases facing the projector to possess light-diffusing properties. In this way, the rough surface is facing the building interior and thus better protected from contamination than would be the case of arrangement on the exterior.

Although in principle, instead of sand-blast frosting, frosting produced by an etching process would also be possible, there are environmental objections to the latter. Grinding treatment that is also possible in principle would involve high technical expense, as in any case when using glass, it could only be carried out after shaping of the U-shaped profile elements.

Therefore, according to the Invention, another preferred alternative to mechanical treatment of the surface(s) of the bases consists of combining light-diffusion treated substrate materials with the bases. These substrate materials can be films or the like, in which light-diffusing particles are embedded or which are provided with a coating of light-diffusing particles.

Especially preferred of course is to apply light-diffusing varnishing to the base. Varnishing has the advantage that the diffusing property can be regulated in a simple manner by the coating thickness and/or the proportion of the light-diffusing particles in the varnish coating applied. In this way, it is also possible to solve the problem of selective and, where applicable, application-specific control of the light-diffusing effect in a simple manner. Especially suitable are varnishes which incorporate a polyamide-based frosting medium and plastic powder with a particle size of 55–65 microns as light-diffusing particles, such as for example the colorless Pehacryl-2K sand-blasting effect varnishes of Messrs Peter Lacke, Hiddenhausen, Germany.

Above all, from the production aspect, it is advantageous if, in addition, the flanges of the U-shaped profile elements possess light-diffusing properties at least in some areas, and in particular possess the same coating or have been treated in the same way as the bases.

BRIEF DESCRIPTION OF THE DRAWINGS

The Invention will be explained in detail below with the aid of a preferred embodiment. The following are shown.

DETAILED DESCRIPTION OF A PREFERRED EMBODIMENT

Figure 1:
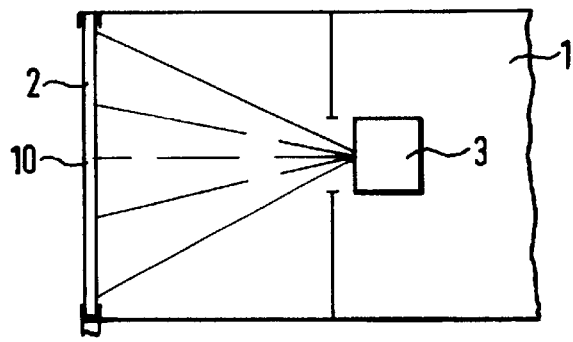
FIG. 1 is, in schematic form, the rear projection screen as part of the curtain wall of a building, for example a large movie theater.

FIG. 1 shows a rear projection screen 2 measuring several meters both horizontally and vertically. On the image-forming surface 10 of this projection screen 2, it is possible to perceive still or moving images projected from a considerable distance by a projector 3 located in the building 1, for example a large movie theater. Of course, for projection of such large format images onto the image-forming surface 10, use is made of state-of-the-art projection and lighting technology, in order to obtain undistorted, high-contrast images, even with oblique projection.

Figure 2:
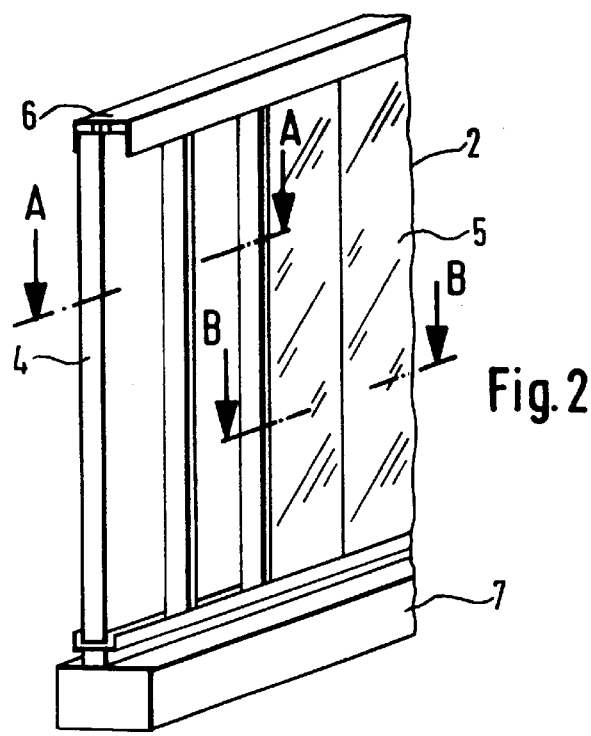
FIG. 2 is a section of a vertically upright rear projection screen composed of U-shaped profile elements.

The rear projection screen 2 designed in accordance with FIG. 2 consists of U-shaped profile elements 4, 5, arranged closely next to one another, extending vertically, laid in a single layer (left-hand half of Drawing) or laid in a double layer (right-hand half of Drawing). It is surrounded in known fashion, with interposition of plastic retaining profiles (not shown), by a metal frame 6, 7 and secured to the building 1 by means of commercial support fixtures. Other fixing alternatives are conceivable and are covered by the Invention. When selecting and designing the supporting structure, it is to be ensured that the image-forming surface 10 provided for image projection is not reduced more than necessary by the supporting structure. The U-shaped profile elements 4 in the embodiment illustrated are formed of glass.

Figure 3:
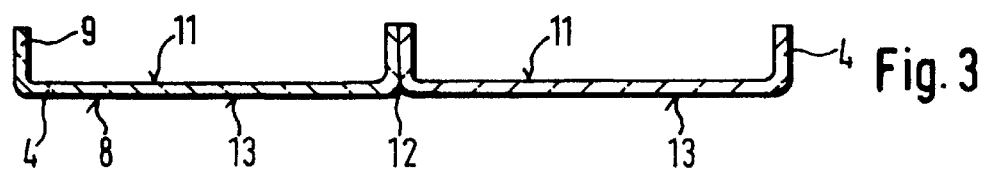
FIG. 3 is a cross-section along line A—A of the rear projection screen according to FIG. 2.

The U-shaped profile elements 4 of the rear projection screen 2 laid in a single layer according to the left-hand drawing half of FIG. 2 and the appropriate FIG. 3 are aligned such that their flanges 9 are facing the projector 3 and that the inner surfaces 11 of the bases 8 form the image-forming surface 10. The inner surfaces 11 of the bases 8 are provided for this purpose with a coating imparting the visual impression of a sand-blasted surface (not illustrated). The effect of the totality of the bases 8 of the U-shaped profile elements 4 as image-forming surface 10 for an image generated by the projector 3 is based on sufficient light transmission and simultaneously efficient diffusion of the light by the coating. The optical properties are achieved by certain additives which, on drying, produce optical effects similar to sand-blast frosting. Light-diffusing varnishes, such as for example colorless Pehacryl-2K sand-blasting effect varnishes of Messrs Peter Lacke, Hiddenhausen, Germany, have proven especially suitable for this purpose. Alternatively or additionally, the outer surface 13 facing the viewer could be designed so as to be light-diffusing.

Figure 4:
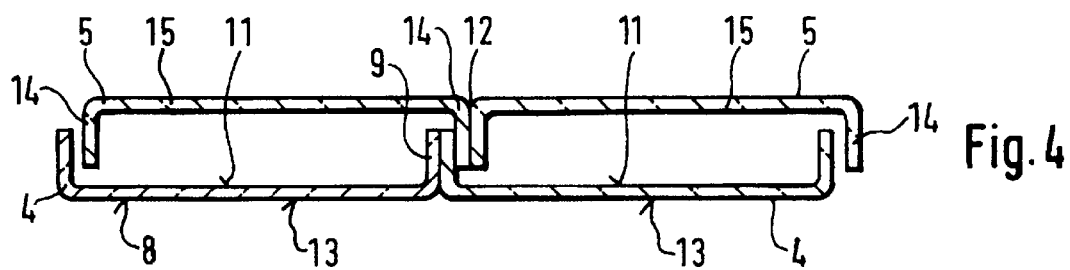
FIG. 4 is a cross-section along line B—B of the rear projection screen according to FIG. 2.

The rear projection screen 2 of U-shaped profile elements 4, 5 laid in a double layer with the flanges 9, 14 arranged in pairs according to the right-hand half of FIG. 2 and the appropriate FIG. 4 is to be employed if improved sound insulation and thermal insulation values and especially high strength in relation to wind loads should be achieved. Laying in a double layer is recommended specially when especially large-area rear projection screens 2 are required or especially high wind load is to be expected at the site. The loss of quality of the projected images due to the U-shaped profile elements arranged between the projector 3 and the image-forming surface 10 can be kept negligibly low if their bases 15 are configured so as to be light-transmitting, with at all events slight light-diffusing effect.

The joints 12 illustrated in FIGS. 3 and 4 between the flanges 9, 14 of adjacent U-shaped profile elements 4, 5 have a width of approximately 2–10 mm, preferably 2–4 mm. As a rule, as joint filling material for mechanically connecting sealing between the U-shaped profile elements 4, 5 and for insertion in the frame structures 6. 7 commercial silicone rubber will be used, in any case, when the U-shaped profile elements 4, 5 are of glass.

The features disclosed in the foregoing description, in the claims and/or in the accompanying drawing may, both separately and in any combination thereof, be material for realizing the invention in diverse forms thereof.

What is claimed is:

1. Rear projection screen with a translucent image-forming surface arranged between a projector and the viewer, wherein the image-forming surface is formed by bases, possessing light-diffusing properties, of a number of U-shaped profile elements arranged side-by-side.

2. Rear projection screen in accordance with claim 1, wherein the bases have inner surfaces facing towards the projector, the inner surfaces having light-diffusing properties.

3. Rear projection screen in accordance with claim 1, wherein at least one surface of each of the bases has been sand-blasted.

4. Rear projection screen in accordance with claim 1, wherein at least one surface of each of the bases has been provided with a coating imparting the impression of a sand-blasted surface.

5. Rear projection screen in accordance with claim 4, wherein the coating comprises a substrate material possessing light-diffusing properties.

6. Rear projection screen in accordance with claim 5, wherein the substrate material is a film with light-diffusing particles embedded therein or applied as a coating.

7. Rear projection screen in accordance with claim 4, wherein the coating is a light-diffusing varnish.

8. Rear projection screen in accordance with claim 1, wherein the U-shaped profile elements are combined with other U-shaped profile elements laid in a double layer.

9. Rear projection screen in accordance with claim 1, wherein the U-shaped profile elements are formed of glass.

10. Rear projection screen in accordance with claim 1, wherein the U-shaped profile elements define flanges extending towards the projector.

11. Rear projection screen in accordance with claim 1, wherein the U-shaped profile elements define flanges, the flanges having light-diffusing properties at least in some areas.

12. Rear projection screen in accordance with claim 11, wherein the bases and the flanges of the U-shaped profile elements possess the same coating or have been treated in the same way in order to impart the light-diffusing properties.

13. Method of projecting an image on a screen comprising arranging a translucent image-forming surface between a projector and an intended viewer, the image-forming surface being formed by bases defined by a plurality of U-shaped profile elements arranged side-by-side, the bases possessing light-diffusing properties, and projecting an image onto the translucent image-forming surface.

14. Method in accordance with claim 13, wherein at least one surface of each of the bases has been provided with a coating imparting the impression of a sand-blasted surface.

15. Method in accordance with claim 14, wherein the coating is a light-diffusing varnish.

16. Method in accordance with claim 13, wherein the U-shaped profile elements are formed of glass.

17. Method in accordance with claim 13, wherein the U-shaped profile elements define flanges extending towards the projector.

18. Method in accordance with claim 13, wherein the U-shaped profile elements define flanges, the flanges having light-diffusing properties at least in some areas.

19. Method in accordance with claim 18, wherein the bases and the flanges of the U-shaped profile elements possess the same coating or have been treated in the same way in order to impart the light-diffusing properties.

* * * * *